United States Patent [19]

Suzuki et al.

[11] 4,172,487
[45] Oct. 30, 1979

[54] PNEUMATIC RADIAL TIRE

[75] Inventors: Yasuo Suzuki, Akigawa; Toshiro Tezuka, Higashi-Murayama; Masaru Abe, Sayama, all of Japan

[73] Assignee: Bridgestone Tire Company Limited, Tokyo, Japan

[21] Appl. No.: 791,074

[22] Filed: Apr. 26, 1977

[30] Foreign Application Priority Data

Apr. 28, 1976 [JP] Japan .................................. 51-47729

[51] Int. Cl.² .......................... B60C 9/22; B60C 9/12
[52] U.S. Cl. ........................... 152/361 R; 152/356 R; 152/359; 152/361 FP; 152/361 DM
[58] Field of Search .................... 152/36, 82, 222, 356, 152/359, 361 R, 361 FP, 361 DM, 357 R

[56] References Cited

U.S. PATENT DOCUMENTS

| 3,345,228 | 10/1967 | Kovac et al. | 152/356 X |
| 3,392,774 | 7/1968 | LeBosse | 152/361 R |
| 3,449,199 | 6/1969 | Mead | 152/357 R X |
| 3,682,222 | 8/1972 | Alderfer | 152/361 R |
| 3,692,080 | 9/1972 | Boileau | 152/361 DM X |
| 3,757,843 | 9/1973 | Carr | 152/361 FP X |
| 3,910,332 | 10/1975 | Felker | 152/222 X |
| 4,077,454 | 3/1978 | Miyoshi et al. | 152/361 R |

FOREIGN PATENT DOCUMENTS 2096405  2/1972  France ...................................... 152/359

Primary Examiner—Francis S. Husar
Assistant Examiner—Randolph A. Reese
Attorney, Agent, or Firm—Sughrue, Rothwell, Mion, Zinn and Macpeak

[57] ABSTRACT

An improved belt construction for a radial or semi-radial tire comprising a reinforcing belt layer including helically formed filaments is disclosed. Between main belt layers is interposed an intermediate reinforcing layer composed of a reinforcing element formed of helically formed filaments each having a tensile breaking strength of at least 140 kg/mm² and elongation at tensile breaking strength of at least 1.2 times the smallest elongation at tensile breaking strength of the cords of the main belt layers. The intermediate reinforcing layer as a whole is extensible and compressible.

7 Claims, 17 Drawing Figures

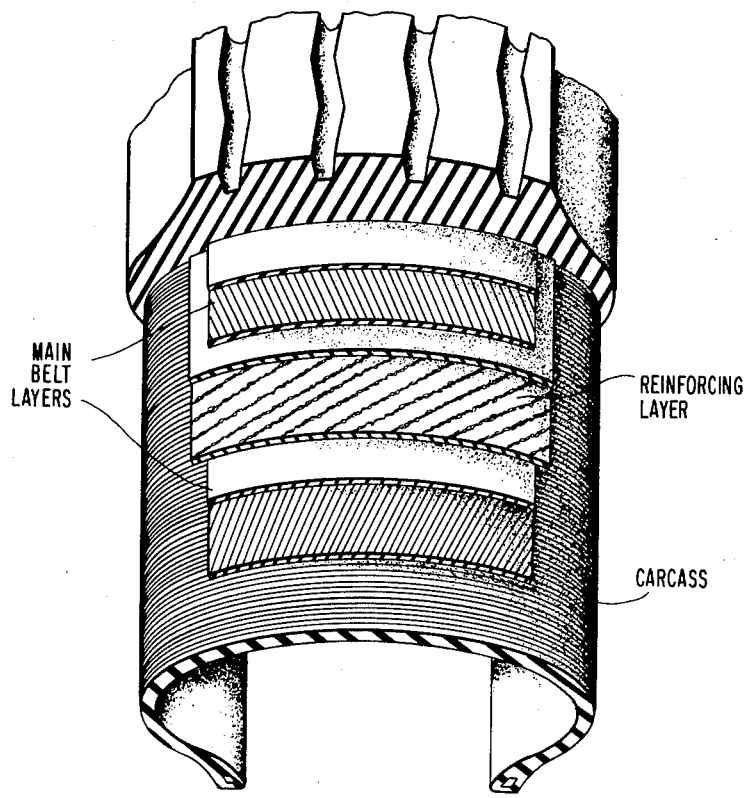

$$D = \frac{D_{max} + D_{min}}{2}$$

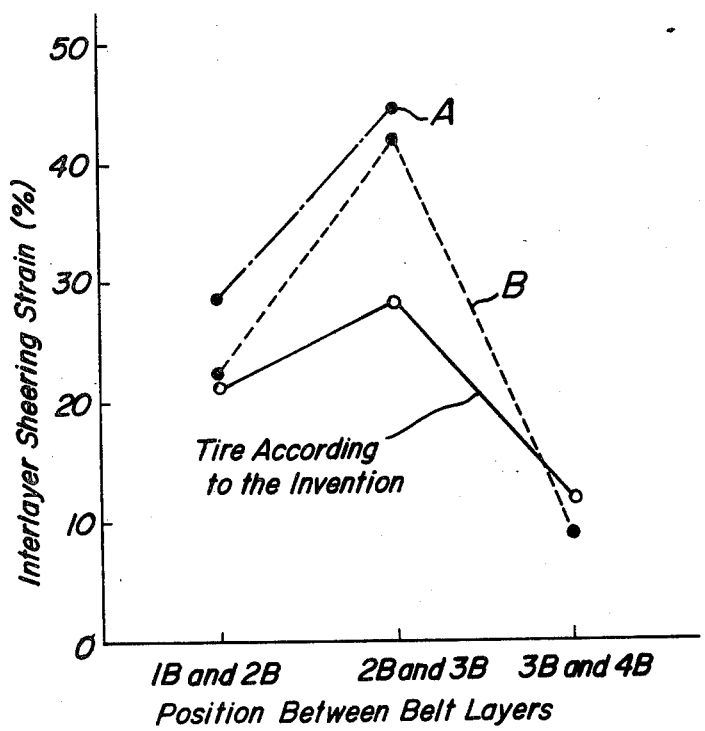

PNEUMATIC RADIAL TIRE

This invention relates to a pneumatic radial tire and more particularly to an improved belt construction for a radial or semi-radial tire comprising a carcass including cords arranged in parallel or substantially parallel with the vertical center section through the rotational axis of the tire and a belt arranged in a tread of the tire and having an excellent rigidity in circumferential direction of the tire.

The terms radial tire and semi-radial tire usually called in pneumatic tire techniques shall be understood to mean a tire construction comprising a carcass composed of one or a plurality of cord fabric plies and extending from one of beads to the other bead, cords of each ply being arranged in parallel or substantially parallel with the vertical center section through the rotational axis of the tire, that is, located at a radial or substantially radial plane of the tire.

A radial tire comprises a reinforcing belt interposed between the carcass and the tread and usually composed of single or a plurality of rubberized cord fabric layers without including weft threads.

Each rubberized layer of the belt is usually formed of inextensible material, for example, a steel cord, glass fiber and the like, these cords in the rubberized layer being extended in parallel with each other and inclined at a small angle to the circumferential direction of the tire.

The abilities of the radial tire, that is, a cornering property, resistance to wear, anti-skid property and cut resistant property thereof are determined by the belt construction. These abilities are attained by a belt having an excellent rigidity in circumferential direction of the tire.

Measures of obtaining the rigidity in the circumferential direction of the belt mainly consist of the use of the above mentioned inextensible material and the cord angle which is small in the circumferential direction of the tire.

On one hand, the larger the tire in size the higher rigidity of the belt construction that is required. In order to satisfy such a requirement, use is made of an inextensible material having particularly high tensile rigidity such as a steel cord, etc. This is because of the fact that the material having a small rigidity requires a large number of belt plies to be used thus increasing the total thickness of the belt, and as a result, small heat accumulation inherent to the radial tire becomes degraded. In a tire for trucks, buses or construction vehicles, if the carcass is formed into the radial construction, tires are confronted with an important problem that requires increase in the cut resistant property. For this purpose, use is made of material having a high tensile rigidity such as a steel cord, etc. When such a radial tire runs on a road at a high speed, a tire failure starts from belt ends, particularly from those belt ends which are inclined at a small angle to the circumferential direction of the tire, thereby inducing a separation failure between adjacent belt layers.

Such separation failure is caused by breakage of the tire due to its heat accumulation and mechanical fatigue and developed into a tire failure.

When the tire runs on a road, the heat accumulation therein becomes remarkably increased at both the belt and the tread which are large in thickness.

In addition, the largest mechanical strain occurs at those belt ends which are in contact with soft rubber.

Particularly, an interlayer shearing strain is produced between the belt layers crossed with each other at a small angle to the circumferential direction of the tire. The amount of such interlayer shearing strain is considerably large. The wider the width of the belt layer or the smaller the cord angle of the belt layer to the circumferential direction or the larger the rigidity of the belt cord is, the larger the amount of the interlayer shearing strain is produced. The measures of decreasing the amount of the interlayer shearing strain are contrary to the measures of increasing the rigidity of the belt necessary for obtaining the characteristics of the radial tire. It is a difficult problem to harmonize the high rigidity of the belt with the excellent characteristics of the radial tire for those skilled in tire design field.

An object of the invention, therefore, is to obviate the above mentioned drawbacks which have been encountered with the prior art techniques.

Another object of the invention is to provide a radial construction tire comprising a belt formed of an inextensible material such as a steel cord, etc., which can reduce separation failure produced when the tire runs on roads at a high speed under a heavy load condition without deteriorating a cut resistant property, resistance to wear and steering property inherent to the radial construction tire and which has an excellent durability.

A feature of the invention is the provision of a pneumatic radial tire comprising a reinforcing belt layer including helically formed filaments, comprising a carcass including cords arranged in parallel or substantially parallel with the vertical center section through the rotational axis of the tire and a belt interposed between said carcass and a tread. At least two main layers have cords formed of inextensible material such as a steel cord, etc., said cords being inclined at a small angle along two directions crossed with respect to the circumferential direction of the tire. The improvement of this invention comprises an intermediate reinforcing layer interposed between said main belt layers and composed of at least one rubberized layer including reinforcing elements spaced apart from each other and embedded therein. The reinforcing layer is formed of a helically formed filament or a bundle of a plurality of helically formed filaments each formed of material having a tensile breaking strength of at least 140 kg/mm². The reinforcing elements have an elongation at tensile breaking strength of at least 1.2 times the smallest elongation at tensile breaking strength of the cords of said main belt layers and the intermediate reinforcing layer as a whole are extensible and compressible.

The inventors have investigated the mechanism of producing the breakage of the belt ends and the method of improving the durability of a radial tire comprising a belt including inextensible cord such as a steel cord, etc. and reinforcing a tread portion when it runs on roads at a high speed under heavy load.

The invention will now be described with reference to the accompanying drawings, wherein:

FIG. 5b is its sectional view through an outer contour projected on a plane perpendicular to the axial direction of one pitch of the filament shown in FIG. 5a;

FIG. 9A is a graph illustrating interlayer shearing strain at various positions between belt layers of the tire according to the invention as compared with that of the conventional tires;

It has been well known that the mechanism of producing the breakage of the belt ends is due to heat accumulation and mechanical fatigue of the tire.

Figure 1:
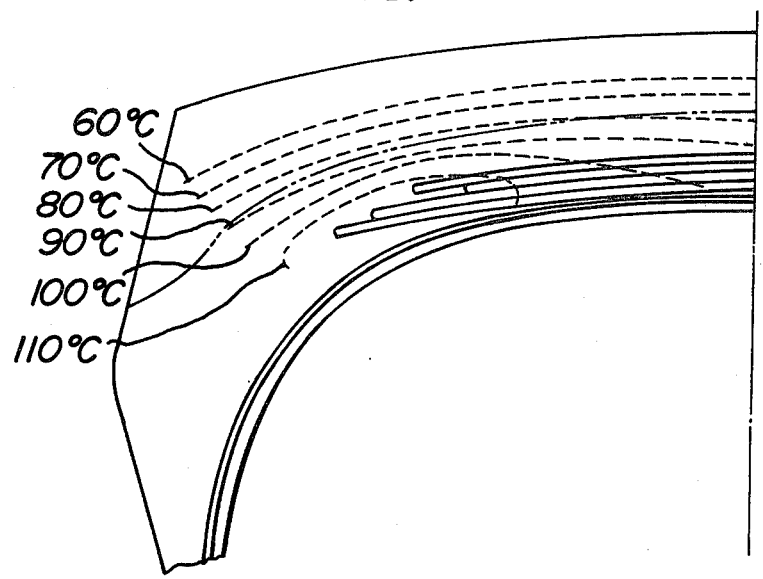
FIG. 1 is a diagrammatic transverse section through a tire illustrating accumulated heat temperature distribution.

In FIG. 1 is shown a temperature distribution produced near a belt of a tire for construction vehicles having a size of 18.00 R33 when the tire runs on road at a speed of 20 km/hour under a load of 14.85 tons. As seen from FIG. 1, the highest temperature is present at that portion of the belt which is located near a point which is ¼ the tread width measured from the shoulder of the tire.

Strains produced at various portions of the belt layer will now be described.

A mechanical strain is produced when an internal pressure is applied in a tire and when the tire is subjected to a load. When the internal pressure is applied in the tire, the belt layer is subjected to tension and a shearing strain is produced between the belt layers.

The rubberized belt including cords inclined at an angle to the circumferential direction is subjected to tension, and as a result, its rigidity is increased. In other words, the shearing strain produced between the belt layers and the strain produced between the cord and rubber function to maintain the belt position against the internal pressure applied in the tire.

This fact will clearly be understood by the following equation given by $$\sigma/\gamma = E$$

where $\sigma$ is a shearing stress, $\gamma$ is a shearing strain and E is a modulus of elasticity.

Figure 2:
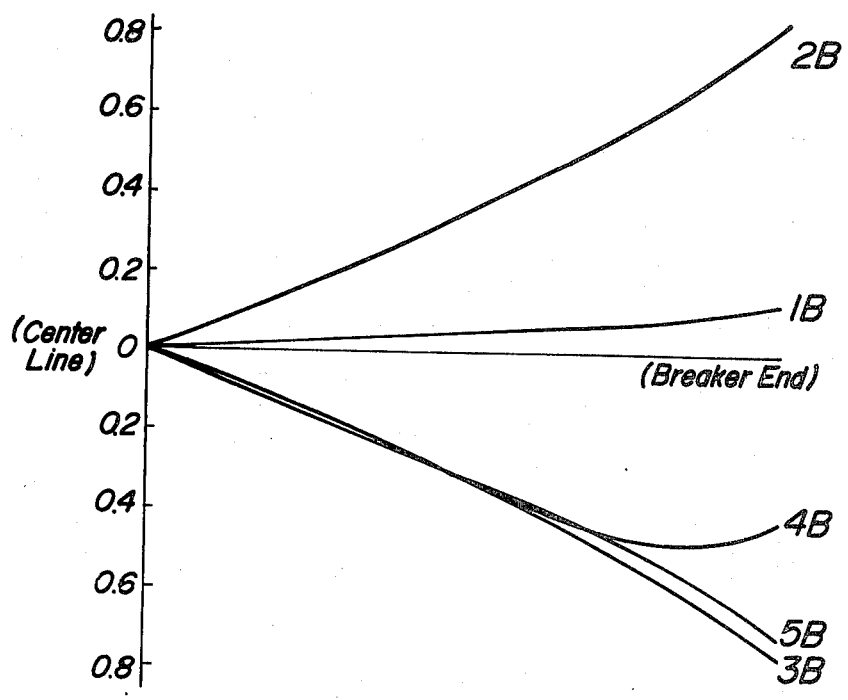
FIG. 2 is a graph illustrating a relative displacement of a belt cord produced when the tire shown in FIG. 1 is inflated by applying a normal internal pressure therein.

In FIG. 2 is shown a relative displacement in the circumferential direction of the belt cord produced when a normal internal pressure of 6.3 kg/cm² is applied in a radial construction tire for construction vehicles having a size of 18.00 R33.

The belt is composed of 5 layers 1B, 2B, 3B, 4B and 5B in the order as mentioned from the carcass side, the cords of the layer 1B being inclined at 60° toward the right in the circumferential direction, the cords of the layer 2B being inclined at 23° toward the right in the circumferential direction, and the cords of the layer 3B inclined at 23° toward the left. The cords of the layer 4B are inclined at 23° toward the right and the cords of the layer 5B are inclined at 23° toward the left. The term right and left shall be understood to mean the direction of the cords. The cord is formed of a conventional steel cord.

The tensile strength of the cords of the layers 1B to 3B are large, while the tensile strength of the cords of the layers 4B and 5B is small.

As seen from FIG. 2, the largest relative displacement in the circumferential direction of the belt layers 1B, 2B, 3B, 4B and 5B and hence the largest interlayer shearing strain occurs between the layers 2B and 3B corresponding to the main belt layers whose cords have the highest rigidity.

Figure 3A:
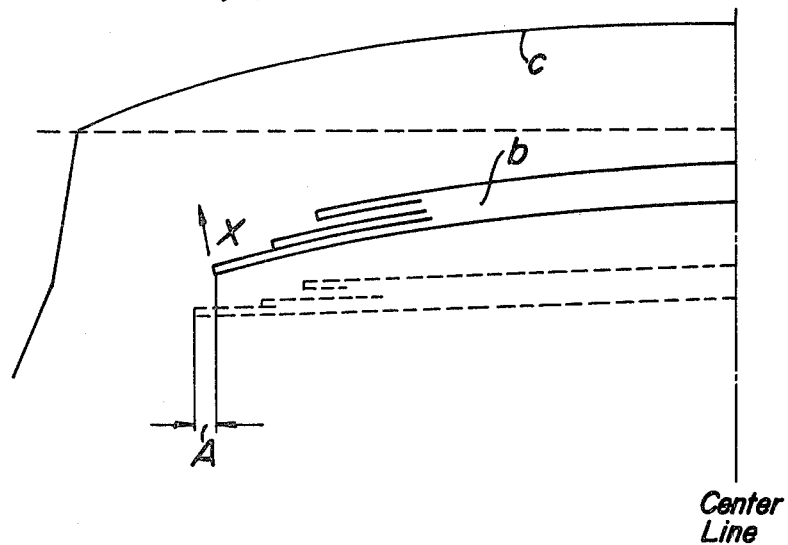
FIG. 3a is a diagrammatic transverse section through a tire illustrating deformation of a belt produced when the tire is subjected to a load.
Figure 3B:
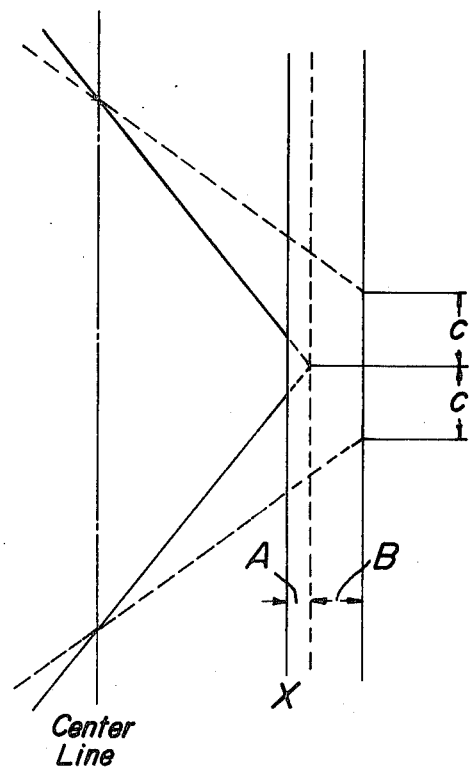
FIG. 3b is a graph illustrating strain produced when a cord angle of the belt shown in FIG. 3a is changed.

FIGS. 3a and 3b diagrammatically illustrate how strain is produced when the tire is subjected to load. As shown in FIG. 3a, in general, the tire tread has at its crown a radius of curvature C in expectation of a uniform wear. It is a matter of course that if the tire is subjected to the load, the ground contact surface of the tire becomes flat. In this case, a belt b embedded therein in substantially parallel with the radius of curvature C of the crown is deformed flat as shown by dotted lines.

This deformation causes the belt b to deform from its arcuate shape shown by full line into a linear shape shown by dotted lines so as to be stretched from X by A in the axial direction of the tire. As a result, the cord angle of the belt is changed to produce strain as shown by dotted lines in FIG. 3b. As seen from FIG. 3b, the largest strain occurs at the belt end.

Figure 4:
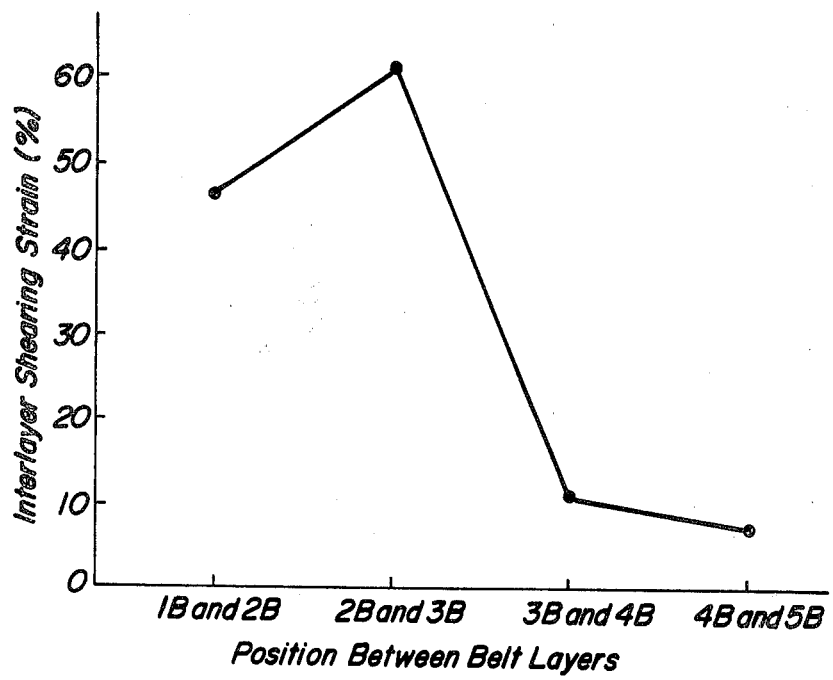
FIG. 4 is a graph illustrating interlayer shearing strain as a function of positions between the belt layers.

In FIG. 4 is shown a relationship between the interlayer shearing strain and position between belt layers when a radial tire having a size of 18.00 R33 is subjected to a load of 9.9 tons.

As seen from FIG. 4, the interlayer shearing strain becomes maximum at a position between the belt layers 2B and 3B in the same manner as in the case when the tire is inflated by applying the internal pressure therein. In fact, it has been found that a separation failure occurs between the belt layers 2B and 3B on the road test of the tire thus rendering the tire useless.

In order to alleviate the maximum interlayer shearing strain, the following measures, etc. have been proposed:

(1) The cord angle of both the belt layers 2B and 3B is made large.

(2) The cords of both the belt layers 2B and 3B are made small in diameter and rigidity.

(3) Rubber sandwiched between the belt layers 2B and 3B is made large in thickness.

All of these measures, however, have led to reduction of the rigidity of the belt and enlargement of the outer diameter of the tire, thereby degrading the resistance to wear, safe steering ability, etc. of the tire and hence deteriorating the ability inherent to the radial tire. As a result, it is not desrious to apply the above mentioned measures to the tire.

The inventors have investigated methods of alleviating the maximum interlayer shearing strain without involving the above mentioned disadvantage and have made the following conclusions.

That is, the maximum interlayer shearing strain can be alleviated by inserting a cord having an excellent strain absorbing property into a space formed between the main belt layers where the maximum interlayer shearing strain occurs. In this case, it is meaningless to use an inextensible reinforcing element such as a steel cord used for a conventional belt. Because, the use of such inextensible reinforcing element results in occurrence of an interlayer shearing strain in a space formed between a layer inclusive of such inextensible reinforcing element (such layer will hereinafter be called as an intermediate reinforcing layer) and the belt layer.

The intermediate reinforcing element is required to be deformed in itself so as to alleviate the interlayer shearing strain produced between the main belt layers.

The inventors have investigated the material and construction having the above mentioned property and recognized that a helically formed filament described in U.S. Pat. No. 3,682,222 has such ability.

This helically formed filament has property and construction to be described later. The inventors have found that an optimum combination of a main belt layer formed of inextensible material such as conventional steel cord, etc. and an intermediate reinforcing layer formed of a helically formed filament provides a radial tire which can have a belt significantly durable without impairing the advantage inherent to the radial tire.

That is, in accordance with the invention, in order to provide such a radial tire, a rubberized cord layer constituting a main belt layer is formed of inextensible cords such as a conventional steel cord and between these main belt layers is inserted an intermediate reinforcing layer formed of a helically formed filament having excellent extension and compression properties.

The property of the helically formed filament is closely associated with the belt material and required to satisfy the following relationship. The rigidity of belt in the circumferential direction of the tire, equals, The shearing strain produced between the belt layers in the absence of the intermediate reinforcing layer The shearing strain produced between the main belt layers (A) and, Deformation of the intermediate reinforcing element formed of a bundle of helically formed filaments (B).

If the bundle of the helically formed filaments is small in its resistance to deformation and hence easily deformable, stress produced therein becomes small to increase the shearing strain (A), and as a result, it is impossible to expect alleviation of the interlayer shearing strain.

On the one hand, if the resistance to deformation of the intermediate reinforcing element B becomes excessively large, the intermediate reinforcing layer B is not deformed, so that the interlayer shearing strain produced between the intermediate reinforcing layer and the main belt layer increases.

The inventors' investigations have produced the result that the helically formed filament may be formed of steel or any other less extensible metal or glass or organic materials, that the helically formed filament formed of material such as nylon or rayon whose tensile breaking strength is on the order of 80 to 110 kg/mm$^2$ does not reveal the ability of the intermediate reinforcing layer, and that the helically formed filament formed of material whose tensile breaking strength is at least 140 kg/mm$^2$, preferably at least 170 kg/mm$^2$ can attain the object of the invention.

The carcass body of the radial tire according to the invention is of so-called radial or semi-radial construction and composed of at least one rubberized ply containing cords embedded therein and formed of steel, metal or organic textile, the cords being arranged in parallel with or inclined at a small angle to the vertical center section through the rotational axis of the tire.

The belt arranged between the carcass and the tread is composed of at least two main layers each composed of a rubberized cord layer containing cords embedded therein and having a tensile breaking strength of at least 190 kg/mm$^2$ and elongation at tensile breaking strength of at most 5%, the cords being inclined at an angle of at most 30° to the circumferential direction of the tire.

Between the main belt layers is arranged the intermediate reinforcing layer composed of helically formed filaments. Before describing the configuration, construction and effect of the intermediate reinforcing layer, the configuration and construction of the helically formed filament according to the invention will now be described.

In accordance with the invention, one or a plurality of, preferably 2 to 50, more preferably 3 to 30 of flexible and permanently helically formed relatively thin filaments each formed of material having a tensile breaking strength of a value within the above mentioned range and a filament diameter of 0.1 mm to 1.0 mm, preferably 0.13 mm to 0.5 mm are assembled together without twisting at random and without winding an exterior binding wire thereabout into a cord which is used as a reinforcing element.

Figure 5A:
FIG. 5a is a front elevational view of a helically formed filament.
Figure 5B:
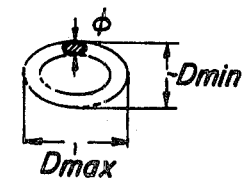

In FIG. 5a is shown the configuration of the helically formed filament and in FIG. 5b is shown an outer contour projected on a plane perpendicular to the axial direction of one pitch of the filament shown in FIG. 5a, the filament being shown in section. It is ideal to make the outer contour shown in FIG. 5b a true circle for the purpose of uniformly distributing tension subjected to the element. But, it is technically very difficult to make the outer contour of the filament a true circle. In addition, a number of steps are required to incorporate the filament into the tire, so that it is still further difficult to maintain such a true circle-shaped outer contour of the filament in the tire product.

Experimental tests and investigations on the practically allowable degree of deviation of the outer contour of the filament from the true circle have demonstrated that if a ratio of the maximum diameter Dmax of the outer contour projected on a plane perpendicular to the axial direction of one pitch of the above mentioned helically formed filament to the minimum diameter Dmin thereof at any part of the tire crown portion lies within a range to be described later, the tension subjected to the filament becomes practically substantially uniformly distributed thereon, and that hence a premature fatique failure of the tire will not be induced.

That is, in FIG. 5b, a ratio of the maximum diameter Dmax to the minimum diameter Dmin, i.e. Dmax/Dmin is required to lie from 1 to 1.5. In addition, the relationship between the average diameter D, i.e. (Dmax+Dmin)/2 of the helically formed filament and the filament diameter $\phi$ has to satisfy $D>2\phi$, preferably $D>3\phi$, more preferably $3\phi<D<15\phi$.

It might be possible to presume that as a method of obtaining a desirous elongation of a filament formed of material having a high tensile breaking strength such as high carbon steel, a plurality of undulate filaments are arranged in one plane and spaced apart from each other. In this case, however, tension is concentrated into bent portions of the undulate filament in response to extension or compression thereof. In addition, this tension is a bending tension that tends to be concentrated into one part in the filament section, so that a premature fatigue failure frequently occurs at these bent portions of the undulate filament. Thus, it is practically impossible to use such undulate filament in place of the helically formed filament.

If provision is made of the helically formed filament in order to obtain any desired elongation, the tension occurring in response to the extension or compression subjected to the filament in its lengthwise direction is substantially uniformly distributed over any portion of the filament in its lengthwise direction. In addition, such tension is a torsional shearing stress that tends to be relatively uniformly distributed in the filament section, so that it is possible to completely prevent the filament from being subjected to the premature fatigue failure.

The inventors' experimental tests and research have yielded the following results. In the first place, in order to prevent breakage of the filament due to fatigue, it is preferable to make the filament diameter $\phi$ small. Secondly, in order to improve the cut resistant property of the filament, the tensile strength per unit area of the filament can be increased by reducing its diameter by drawing it, so that it is preferable to make the filament diameter $\phi$ small.

But, if the filament diameter $\phi$ is smaller than 0.1 mm, the filament is frequently cut in a non-allowable recurrence in the step of helically forming the filament, and as a result, a small filament diameter is not economical. On the contrary, if the filament diameter $\phi$ exceeds 1.0 mm, the internal stress produced in the filament in the step of helically forming filament becomes excessively large. In addition, the torsional shearing force produced when the filament is subjected to extensible or compressive force in its lengthwise direction is concentrated into the outer contour portion of the filament. As a result, in order to provide the filament having a tensile strength which is sufficient to resist the same exterior force as in the case of the filament having a small diameter, the overall sectional area of the filament must be made large if compared with the small diameter filament, thereby requiring a large amount of material. As a result, such an excessively large filament diameter is also not economical.

As can be seen from the above, the filament diameter $\phi$ should lie within the above mentioned range.

The relationship between the filament diameter $\phi$ on the one hand and the average diameter D of the outer contour projected on a plane perpendicular to the axial direction of one pitch of the filament on the other hand will now be described. If D is smaller than $2\phi$, the pitch of the filament must be made excessively small for the purpose of obtaining a desired elongation. In the same manner as in the case of making the filament diameter $\phi$ excessively small, the filament becomes frequently cut in a non-allowable recurrence in the step of helically forming the filament. At the same time, the internal stress produced in the step of helically forming the filament becomes excessively large.

On the one hand, a plurality of helically formed filaments are assembled together without twisting at random into a cord-shaped reinforcing element which is then arranged in the tire. In this case, a plurality of cord-shaped reinforcing elements are arranged in zig-zag in the tire, so that if D is larger than $20\phi$, the number of reinforcing elements must be made small for the purpose of maintaining a distance between the most protruded portions of the two adjacent reinforcing elements that are required for a desired separation resistant property of the tire. As a result, the reinforcing element does not function as the intermediate reinforcing layer. On the contrary, if the number of reinforcing elements is made large in order to make the rigidity of the intermediate reinforcing layer high, the above mentioned distance between the two adjacent reinforcing elements could not be maintained, and as a result, the desired separation resistant property of the tire can not be expected.

In addition, in order to maintain the desired separation resistant property of the tire, not only a distance between the two adjacent reinforcing elements in transverse direction thereof, but also a distance between two superimposed main belt layers disposed on and beneath one reinforcing element when such one reinforcing element only is used as well as a distance between two adjacent reinforcing layers when such two reinforcing elements are used must be kept within a certain range. The distance must be of one measured between the most protruded portions of the two adjacent reinforcing elements, so that it is always necessary to make a rubber layer large in thickness, thereby impeding economy and degrading the rigidity of the belt. As seen from the above, the average diameter D of the helically formed filament must lie within the above mentioned range.

The pitch of the helically formed filament may suitably be selected in association with a modulus of elasticity of the filament, filament diameter $\phi$ and average diameter D of the outer contour projected on a plane perpendicular to the axial direction of one pitch of the filament such that the optimum elongation at tensile breaking strength and modulus of elasticity of the tire required for the use thereof are obtained.

The number of helically formed filaments to be assembled together without twisting at random into a cord-shaped reinforcing element should be smaller than 50. If this number exceeds 50, the bundle diameter becomes excessively large even though the average diameter D of one helically formed filament is small. The same problem occurs as was encountered when the average diameter D is excessively large. As a result, the number of helically formed filaments to be assembled together without twisting at random into a cord-shaped reinforcing element may suitably be selected within the above mentioned range by taking into consideration a balance between the cut resistant property required for the use of the tire and any other abilities and economy.

The relation between the force subjected to the reinforcing elements constructed as above described according to the invention and to a conventional stranded steel cord on the one hand and elongations produced in the element and cord on the other hand will now be described with reference to a practical example.

Figure 6:
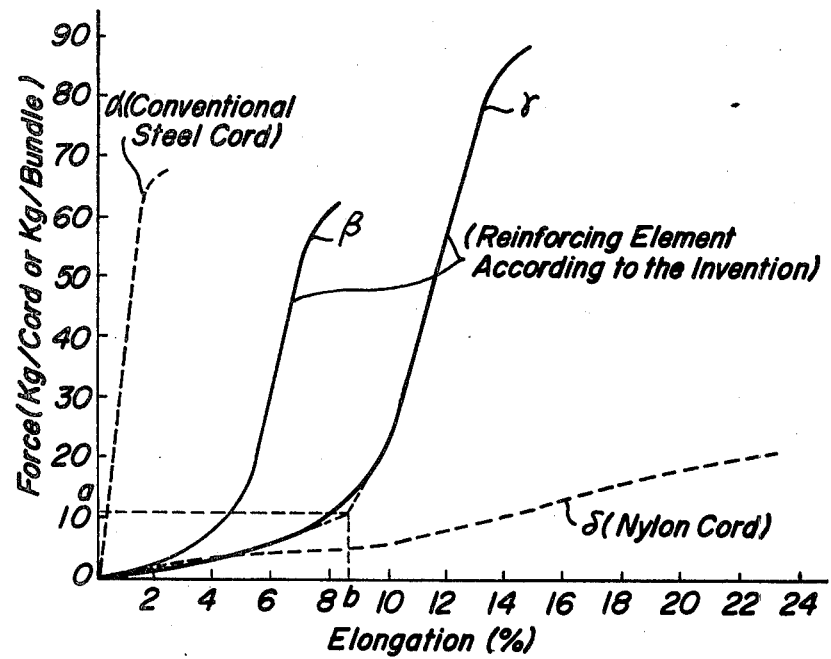
FIG. 6 is a graph illustrating a relation between a force subjected to a reinforcing element according to the invention, conventional steel cord and nylon cord and an elongation produced in these element and cord.

In FIG. 6 is shown tensile test results with the force in kg/cord or kg/bundle taken on ordinate and with the elongation in % on abscissa. In FIG. 6, the dotted line curve $\alpha$ shows a tensile test result obtained from a conventional steel cord having a strand construction of 1×5, filament diameter $\phi$ of 0.25 mm and cord diameter of 0.68 mm. Full line curves $\beta$ and $\gamma$ show tensile test results obtained from reinforcing elements according to the invention. The tensile test result shown by the full line curve β was obtained from a reinforcing element composed of a bundle of 5 filaments according to the invention each having a filament diameter φ of 0.25 mm, average diameter D of an outer contour projected on a plane perpendicular to the axial direction of one pitch of the filament of 0.95 mm, Dmax/Dmin=1.25, D/φ=3.8, and pitch of 10.5 mm. The tensile test result shown by the full line curve γ was obtained from a reinforcing element composed of 14 filaments according to the invention each having a filament diameter of 0.175 mm, average diameter D of an outer contour projected on a plane perpendicular to the axial direction of one pitch of the filament of 1.1 mm, Dmax/Dmin−1.20, D/φ=6.3 and pitch of 11 mm. In FIG. 6, a dotted lines curve ε shows a tensile test result obtained from a conventional nylon cord of 1,260 denier/2 strands.

As seen from FIG. 6, the relation between the force subjected to the intermediate reinforcing elements according to the invention and the elongation thereof shows that the elongation b within the proportional limit is larger than that of the conventional steel cord. That is, the elongation b of the intermediate reinforcing elements according to the invention when the elements are subjected to the small force a is larger than that of the conventional steel cord. This modulus of elasticity at the initial stage which is defined by b/a in FIG. 6 is important for obtaining the extension and contraction characteristic of cords required for reducing the shearing strain to be produced when the cords are subjected to the belt tension which is not always so large as to break the cords. The reinforcing element composed of a bundle of helically formed filaments having a small diameter φ is excellent in the above mentioned modulus of elasticity. It will be understood, therefore, that such reinforcing element is ideal for attaining the object of the invention.

The use of the reinforcing element composed of a bundle of helically formed filaments according to the invention ensures a significant reduction of the compression modulus of elasticity of the reinforcing element.

The difference between the compression modulus of elasticity and compression fatigue property of the reinforcing element according to the invention and those of the conventional stranded steel cord used for the belt layer will now be described with reference to a practical example.

Figure 7:
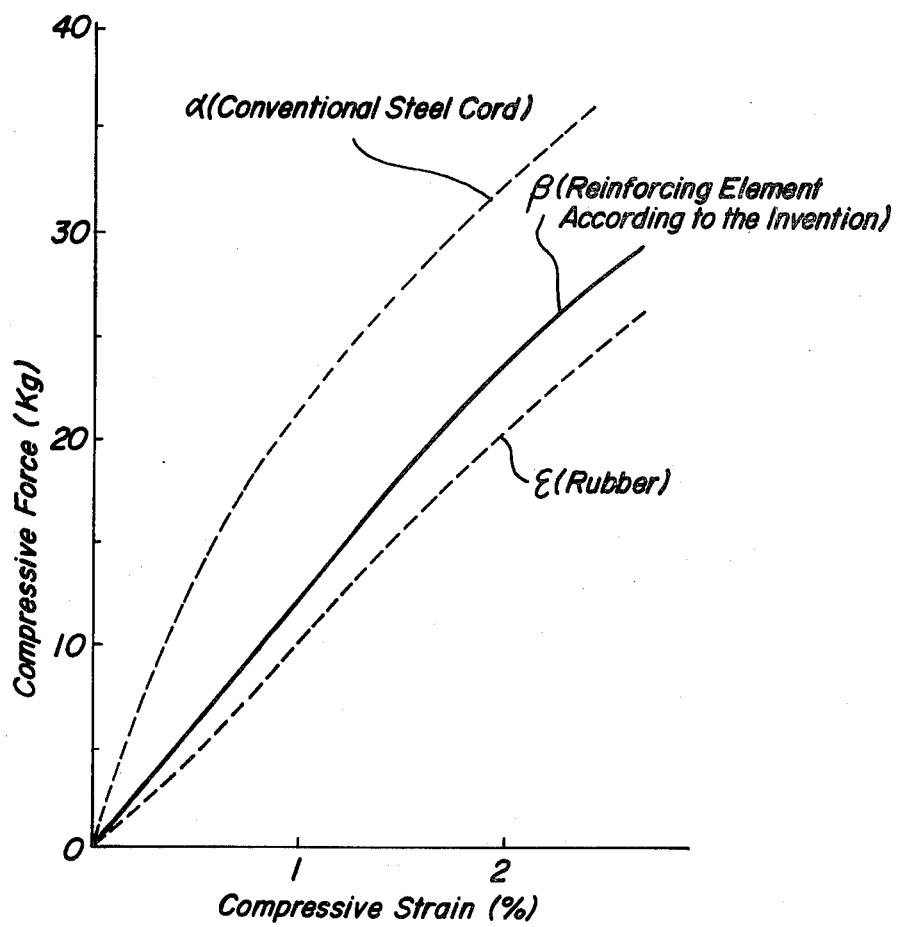
FIG. 7 is a graph illustrating a compression modulus of elasticity of rubberized reinforcing element according to the invention and rubberized conventional steel cord compared with that of rubber.

FIG. 7 shows compression test results. In FIG. 7, the compressive force in kg is taken on ordinate and the compressive strain in % is taken on abscissa. In this test, use was made of two test pieces, one of which being composed of a cylindrical rubber containing one conventional stranded steel cord embedded therein and the other being composed of the same cylindrical rubber containing one reinforcing element formed of one bundle of helically formed filaments according to the invention embedded therein.

In FIG. 7, a dotted lines curve α shows the relation between the compressive force in kg subjected to the conventional stranded steel cord having a stranded construction of 1×5, filament diameter φ of 0.25 mm and cord diameter of 0.68 mm and the compressive strain in % produced therein. A full line curve β shows the relation between the compressive force in kg subjected to the reinforcing element according to the invention composed of 5 filaments each having a diameter φ of 0.25 mm, average diameter D of an outer contour projected on a plane perpendicular to the axial direction of one pitch of the filament of 0.95 mm, Dmax/Dmin=1.25, D/φ=3.8 and pitch of 10.5 mm and the compressive strain in % produced therein. In FIG. 7, a dotted lines curve ε shows the same relation with respect to a test piece formed of rubber only. It is a matter of course that the rubber of all of these three test pieces is of the same rubber compound.

As seen from FIG. 7, the compression modulus of elasticity of the reinforcing element according to the invention is extremely small and close to a value of the rubber specimen.

Figure 8:
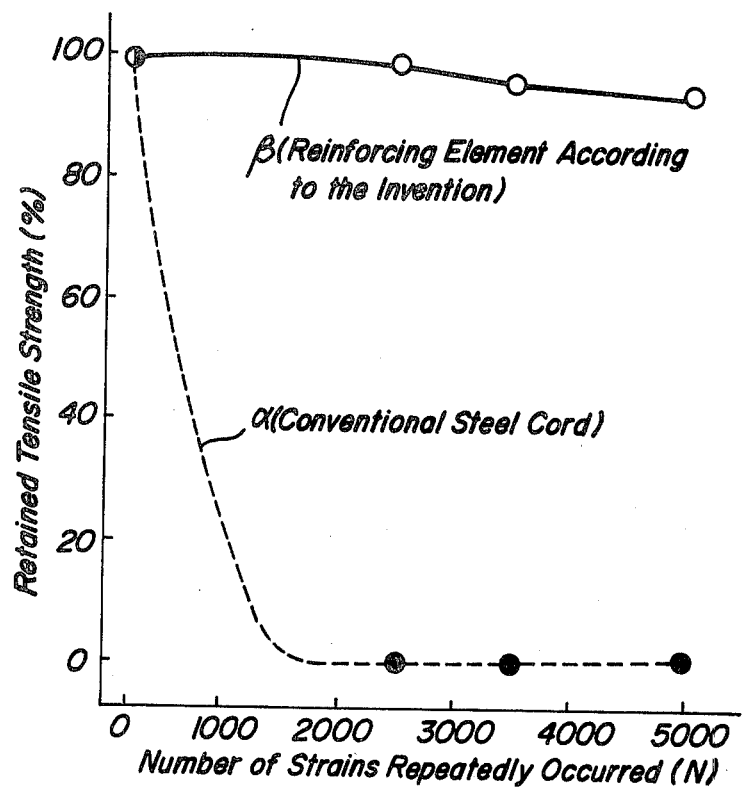
FIG. 8 is a graph illustrating retained tensile strength of the reinforcing element according to the invention obtained in the case that strains repeatedly occurred therein and that of the conventional steel cord.

In FIG. 8 is shown a compression fatigue test result. A percentage of tensile strength after the fatigue test with that of a new tire, i.e. retained tensile strength in % is taken on ordinate and number of strains repeatedly occurred is taken on abscissa. In the present test, use was made of two test pieces, one being composed of a rectangular rubber body containing a plurality of conventional stranded steel cords embedded therein and the other being composed of the same rectangular rubber body containing a plurality of bundles of helically formed filaments according to the invention embedded therein, and these two test pieces were subjected to 5% repeating compressive strain in an intermittent manner.

In FIG. 8, a dotted lines curve α shows the retained tensile strength as a function of the number of strains repeatedly occurred for the conventional stranded steel cord having a stranded construction of 1×5, filament diameter φ of 0.25 mm and cord diameter of 0.68 mm and a full line curve β shows a relation similar to the dotted lines curve α for the reinforcing element according to the invention composed of 5 filaments each having a filament diameter φ of 0.25 mm, average diameter D of an outer contour projected on a plane perpendicular to the axial direction of one pitch of the filament of 0.95 mm, Dmax/Dmin=1.25, D/φ=3.8 and pitch of 10.5 mm. As seen from FIG. 8, the retained tensile strength of the reinforcing element according to the invention is far superior to that of the conventional steel cord.

The configuration, construction and effect of the intermediate reinforcing layer composed of the reinforcing element shaped and constructed as above described according to the invention will now be described.

Rubber which constitutes together with the reinforcing elements of the intermediate reinforcing layer, may be made of a rubber compound having a Shore A hardness of 50° to 85°, 300% modulus of elasticity of 100 to 250 kg/cm² and tensile breaking strength of 150 to 250 kg/cm², preferably a soft rubber having a large elongation and movable in response to the deformation of the reinforcing element. More particularly, the use of rubber having a hardness and modulus of elasticity which are equal to or smaller than those of the coating rubber of the belt ensures a significant effect.

Figure 14:
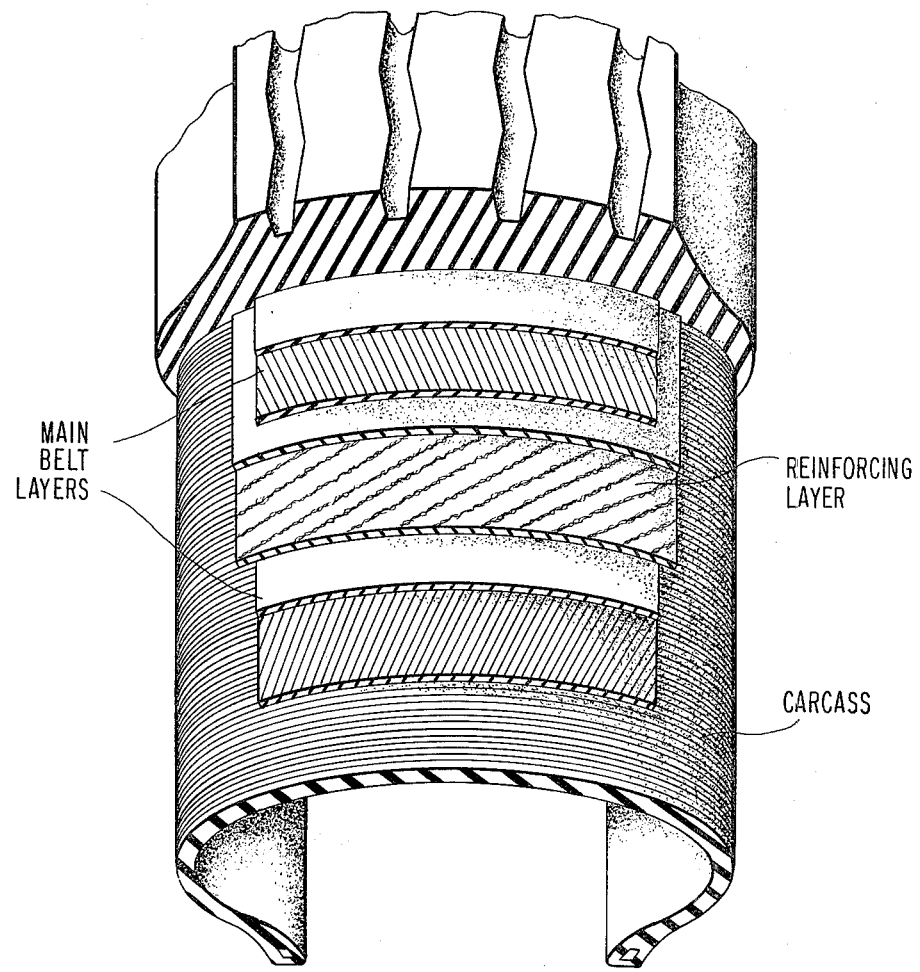
FIG. 14 shows a cutaway perspective view of a section of a tire according to the invention.

The reinforcing element of the intermediate reinforcing layer is closely related to the cord angle of the main belt layers of the belt disposed on and beneath the intermediate reinforcing layer, but is inclined at an angle of 15° to 75°, preferably 18° to 70° with respect to the circumferential direction of the tire. An exemplary arrangement of the reinforcing element layers, illustrating some possible relative cord angles, is shown in the cutaway perspective view of FIG. 14.

The intermediate reinforcing layer may be arranged near the belt ends only by taking the object thereof into consideration. If 2 intermediate reinforcing layers are used, the reinforcing element of one of these layers may be crossed with the reinforcing element of the other layer with respect to the circumferential direction of the tire. Alternatively, the cord angles of the two adjacent intermediate reinforcing layers may be inclined in the same direction with respect to the circumferential direction of the tire. In this case, it is possible to effectively prevent separation failure of the tire caused by mechanical strain subjected thereto.

The property of the intermediate reinforcing layer relates to the material and construction of the main belt layers disposed on and beneath the intermediate reinforcing layer. It is preferable to use a reinforcing element having an elongation at tensile breaking strength which is at least 1.2 times, preferably 1.5 times the smallest elongation at tensile breaking strength of steel cord used for the main belt layers, modulus of elasticity within proportional limit of at most $5 \times 10^3$ kg/mm$^2$, preferably at most $4 \times 10^3$ kg/mm$^2$ and compression modulus of elasticity of a value which is smaller than 0.9 times, preferably smaller than 0.7 times the largest compressive modulus of elasticity of the steel cord used for the main belt layer. The term the modulus of elasticity within the proportional limit shall be understood to mean a value defined by $$\frac{a}{(\frac{b}{100}) \times S}$$

where a is a tension in kg subjected to the cord or the reinforcing element within an elastic limit wherein the modulus of elasticity of the cord or reinforcing element can be restored, b is an elongation in % produced therein and S is an effective sectional area in mm$^2$ of the cord.

The width of the intermediate reinforcing layer in its widthwise direction may be wider or narrower than the width of the main belt layers disposed on and beneath thereof. More particularly, the width of the intermediate reinforcing layer containing helically formed filaments embedded therein may be made equal to or wider than that the width of the main belt layers disposed on and beneath the intermediate reinforcing layer without involving the problem of increasing the shearing strain as in the case of using the conventional steel cord. In addition, in the case of using a bundle of a plurality of helically formed filaments, these helically formed filaments are assembled together without twisting at random contrary to the conventional steel cord formed of twisted filaments. As a result, it is possible to sufficiently penetrate the rubber into gaps formed between the filaments which mechanical bonding force can compensate for insufficient rubber-to-filament chemical bonding.

In addition, if a rubberized layer containing steel cords inclined at a large angle with respect to the circumferential direction of the tire or containing steel cords having a large elongation or small rigidity is interposed as an auxiliary means between the intermediate reinforcing layer and the main layer of the belt, it is possible to effectively change the rigidity of the tire in a stepwise manner.

The helically formed filament constituting the reinforcing element of the intermediate reinforcing layer may be formed of a wire material having an excellent rubber-to-filament bonding property, particularly brass plated steel filament and any other metal fibers, glass fiber or aromatic polyamide fiber having a high modulus of elasticity, etc. which can satisfy the above mentioned requirements.

The invention, therefore, is capable of providing a radial tire comprising a belt layer having excellent durability and high ability.

Effective embodiments of the pneumatic radial tire according to the invention will now be described.

EXAMPLE 1

Figure 9:
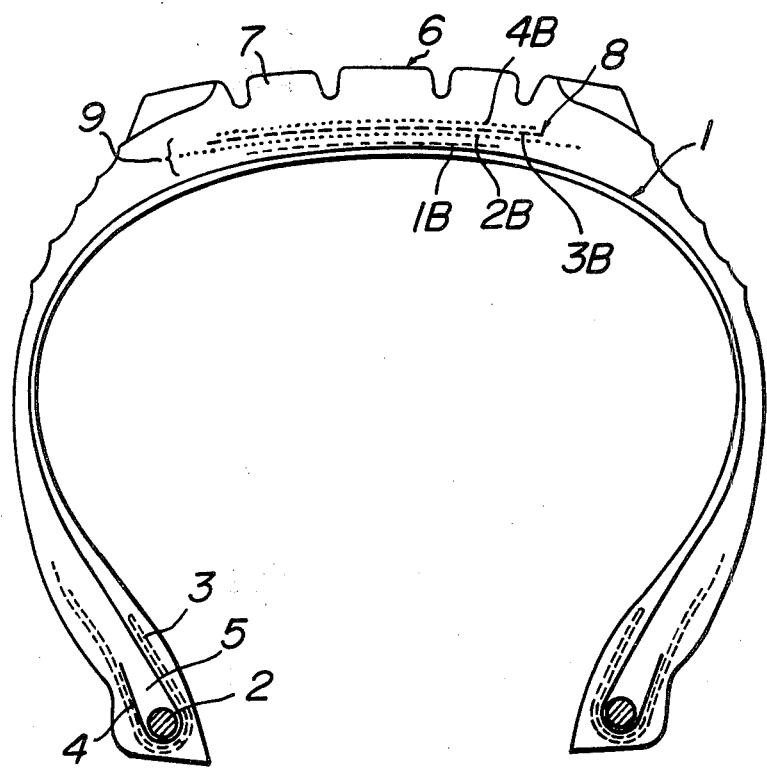
FIG. 9 is a diagrammatic transverse section through an embodiment of the tire according to the invention.

FIG. 9 shows a vertical center section through the rotational axis of a pneumatic radial tire according to the invention. The tire shown in FIG. 9 is of a steel radial tire for trucks and buses having a tire size of 10.00 R20 14PR. A carcass 1 composed of 1 ply formed of steel cords is extended from one of beads through a tire crown portion to the other bead in parallel with the vertical center section through the rotational axis of the tire. The carcass 1 is formed of usual steel cords.

The steel cord of the carcass 1 has a tensile breaking strength of 170 kg/cord. Both ends of the carcass 1 are wound around and secured to a pair of bead wires 2, respectively, to form turn-up portions 4. In order to further reinforce the bead portions, each bead wire 2 is further wound by a chafer 3 composed of 1 rubberized nylon cord layer.

In addition, a bead filler 5 formed of hard rubber having a Shore A hardness of 80° is arranged in a space surrounded by the carcass 1, bead wire 2 and turn up portion 4 of the carcass ply.

In a crown portion 6, a belt 9 composed of 4 layers inclusive of 1 intermediate reinforcing layer 8 is interposed between the carcass 1 and a tread 7. The belt 9 is composed of 4 layers 1B, 2B, 3B and 4B arranged in the order as mentioned from the carcass side, the belt layer 3B constituting the intermediate reinforcing layer 8 and the other belt layers 1B, 2B, 4B having construction shown in the following Table.

Table

| Steel cord construction | Tensile breaking strength | Elongation at tensile breaking strength | Cord angle |
|---|---|---|---|
| 1B (1 × 3) × 0.15mm + (1 × 6) × 0.38mm | 188 kg/cord | 3% | 60° inclined toward right |
| 2B (1 × 3) × 0.15mm + (1 × 6) × 0.38mm | " | " | 20° inclined toward right |
| 4B (1 × 3) × 0.15mm + (1 × 6) × 0.38mm | " | " | 20° inclined toward left |

In the belt 9, the intermediate reinforcing layer 8 constituting the belt layer 3B is composed of 1 rubberized fabric containing a bundle of 5 helically formed steel filaments each having a filament diameter $\phi$ of 0.25 mm, average diameter D of an outer contour projected on a plane perpendicular to the axial direction of one pitch of the filament of 0.95 mm, Dmax/Dmin = 1.25, $D/\phi = 3.8$ and pitch of 10.5 mm. The number of the reinforcing filaments per 25 mm of the rubberized fabric is 10. These reinforcing elements are inclined toward left at 20° with respect to the circumferential direction of the tire. In the present example, the reinforcing element composed of the bundle of 5 helically formed filaments has a tensile breaking strength of 70 kg/bundle, elongation at tensile breaking strength of 5.5% and modulus of elasticity of 1,800 kg/mm².

The rubber sheet used for covering the belt 9 has a Shore A hardness of 78°, elongation at tensile breaking strength of 350%, 300% modulus of elasticity of 170 kg/cm².

In order to ascertain the ability of the tire according to the invention, a tire (A) was compared having the same construction as the tire according to the present example, but in which the above mentioned intermediate reinforcing layer 8 is absent and another tire (B) was compared having the same construction as the tire according to the present example, but in which the above mentioned intermediate reinforcing layer 8 is replaced by the conventional steel cord, i.e. the steel cord whose construction is the same as the belt layer 1B. Then, interlayer shearing strain at the belt end of each of these three tires was measured.

In FIG. 9A is shown the interlayer shearing strain at the belt end thus measured of each of these three tires when the internal pressure of 6.7 kg/cm² was applied under load of 2.4 ton.

As seen from FIG. 9A, the maximum shearing strain occurs between the belt layers 2B and 3B. It has been proved that the interlayer shearing strain of the tire according to the invention is smaller than those of the comparative tires by 35%.

In addition, in order to ascertain the durability of these tires, these tires were subjected to an indoor drum test. This test is of a belt endurance test in which a steel drum having a diameter of 1.7 m is used and the tires to be tested are inflated by applying an internal pressure of 6.7 kg/cm² and driven at a constant speed of 60 km/hour and are urged against the steel drum under loads of JIS 40% and JIS 60% applied in a step up manner. The results of the test are shown in the following Table.

Table

| | | | |
|---|---|---|---|
| Comparative Tire A | 5,300 km | Between 2B and 3B | Separation occurs |
| Comparative Tire B | 7,600 km | Between 2B and 3B | Separation occurs |
| Tire according to the invention | 9,800 km | Between 2B and 3B | Local breakage occurs |

As seen from the above Table, the invention is capable of improving the durability of the tire.

EXAMPLE 2

Figure 10:
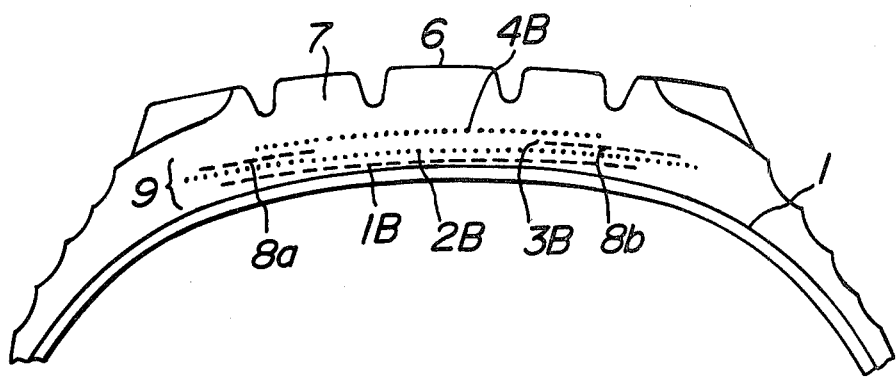
FIGS. 10 to 13 are diagrammatic transverse sections through various modified embodiments of the tire according to the invention.

In FIG. 10 is shown another embodiment of the tire according to the invention. In the present embodiment, the intermediate reinforcing layer 8 composed of helically formed filament shown in FIG. 9 is divided into two intermediate reinforcing layer sections 8a, 8b and these sections are arranged near the belt ends, respectively.

These sections 8a, 8b are spaced apart from each other at the crown center by 80 mm and each has a width of 35 mm. As a result, these sections 8a, 8b extend over a width of 150 mm.

The maximum interlayer shearing strain occurs at the belt ends so that the intermediate reinforcing layer sections 8a, 8b are inserted between the belt ends so as to reduce the interlayer shearing strain subjected thereto. The use of the measures described provides the advantage making it possible to prevent interlayer shearing strain while bringing down the manufacturing cost of the tire.

EXAMPLE 3

Figure 11:
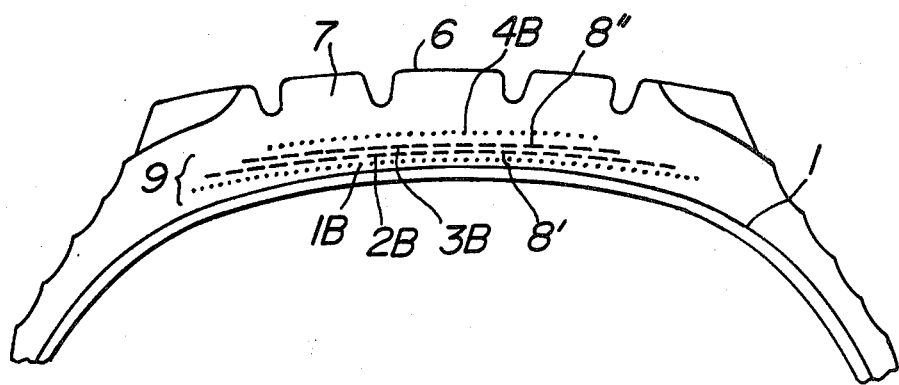

In FIG. 11 is shown a further modified embodiment of the tire according to the invention. In the present embodiment, use is made of 2 intermediate reinforcing layers 8', 8".

The belt 9 is composed of 4 layers 1B, 2B, 3B and 4B arranged in the order as mentioned from the carcass side. Each of the cords of the belt layers 1B, 4B is formed of the conventional steel cord and has a tensile breaking strength of 188 kg/cord and elongation at tensile breaking strength of 3%. The cords of the belt layers 1B, 4B are inclined at 20° toward right and 20° toward left with respect to the circumferential direction of the tire. The intermediate reinforcing layers 8', 8" correspond to the belt layers 2B, 3B, respectively, and each composed of a rubberized reinforcing element formed of 5 helically formed filaments each having a filament diameter $\phi$ of 0.25 mm, average diameter D of an outer contour projected on a plane perpendicular to the axial direction of one pitch of the filament of 0.95 mm, Dmax/Dmin = 1.25, $D/\phi = 3.8$ and pitch of 10.5 mm. The reinforcing element has a tensile breaking strength of 70 kg/element, elongation at tensile breaking strength of 5.5% and modulus of elasticity of 1,800 kg/mm². The reinforcing element in the belt layer 2B is inclined at 20° toward right with respect to the circumferential direction of the tire and the reinforcing element in the belt layer 3B is inclined at 20° toward left with respect to the circumferential direction of the tire.

As a result, the tire reinforcing elements in the intermediate reinforcing layers 8', 8" can absorb the interlayer shearing strain produced between the belt layers 1B and 4B. In the present embodiment, the coating rubber used for the belt layers 1B, 4B has a Shore A hardness of 78°, elongation at tensile breaking strength of 350% and 300% modulus of elasticity of 170 kg/cm², while the coating rubber used for the belt layers 2B, 3B has a Shore A hardness of 67°, elongation at tensile breaking strength of 430% and 300% modulus of elasticity of 134 kg/cm² and hence can easily absorb deformation of the belt 9.

EXAMPLE 4

Figure 12:
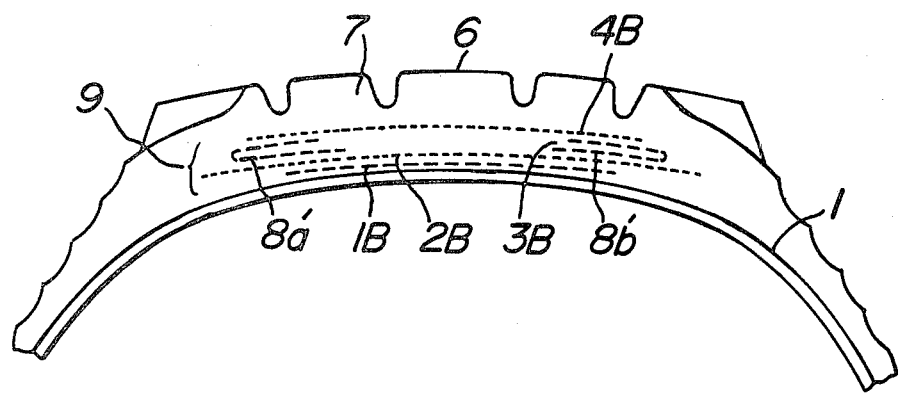

In FIG. 12 is shown a still further embodiment of the tire according to the invention. In the present embodiment, the 2 intermediate reinforcing layers shown in FIG. 11 are used such that these layers effectively function at the belt ends where the maximum interlayer shearing strain occurs.

In the present embodiment, the intermediate reinforcing layer 8 shown in FIG. 9 is divided into two sections 8a', 8b'. These sections are spaced apart from each other and belt at both belt ends with bent ends opposed with each other.

The reinforcing element constituting each of these sections 8a', 8b' is composed of a bundle of 5 helically formed filaments each having a filament diameter $\phi$ of 0.25 mm, average diameter D of an outer contour projected on a plane perpendicular to the axial direction of one pitch of the filament of 0.95 mm, Dmax/Dmin=1.25, D/φ=3.8 and pitch of 10.5 mm.

The reinforcing element composed of bundle of 5 helically formed filaments has a tensile breaking strength of 70 kg/bundle, elongation at tensile breaking strength of 5.5%, and modulus of elasticity of 1,800 kg/mm². The reinforcing element in each of these 8a', 8b' is inclined at 20° with respect to the circumferential direction of the tire. Each of these sections 8a', 8b' is formed by bending an intermediate reinforcing layer having a width of 70 mm in a way such that there is produced a step having a width of 10 mm between the belt ends. The reinforcing element in each of these sections 8a', 8b' extends in the same direction as the cords in the main layer of the belt 9. The use of such bent sections 8a', 8b' makes it possible to not only eliminate the interlayer shearing strain produced at the ends of the intermediate reinforcing layer but also make occurrence of the interlayer shearing strain between the intermediate reinforcing layer and the main belt layer difficult. The use of such bent sections 8a', 8b' as well as the helically formed filament ensures a significant improvement of the durability of the belt.

EXAMPLE 5

Figure 13:
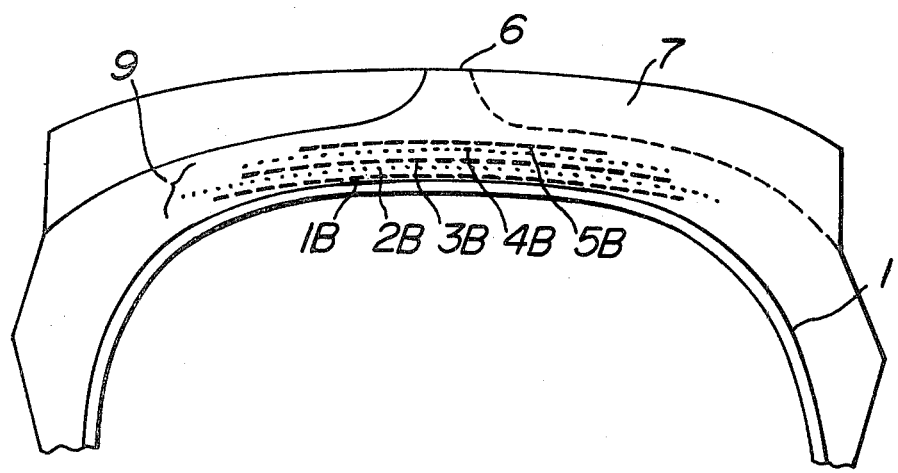

In FIG. 13 is shown another embodiment of the tire according to the invention which is applied to a belt construction of a radial tire for construction vehicles.

In the present embodiment, a belt 9 is composed of 5 layers 1B, 2B, 3B, 4B and 5B in the order as mentioned from the carcass side and having constructions shown in the following Table.

Table

| Kind | | Tensile breaking strength | Elongation at tensile breaking strength | Cord angle |
|---|---|---|---|---|
| 1B | Bundle of helically formed filaments | 170 kg/bundle | 7% | 60° toward right |
| 2B | Steel cord | 560 kg/cord | 3.3% | 21° toward right |
| 3B | Bundle of helically formed filaments | 170 kg/bundle | 7% | 30° toward left |
| 4B | Steel cord | 560 kg/cord | 3.3% | 21° toward left |
| 5B | Bundle of helically formed filaments | 170 kg/bundle | 7% | 30° toward right |

In the belt 9, each of the intermediate reinforcing layers 1B, 3B, 5B is composed of 1 rubberized fabric containing a bundle of 21 helically formed steel filaments each having a filament diameter φ of 0.23 mm, average diameter D of an outer contour projected on a plane perpendicular to the axial direction of one pitch of the filament of 2.07 mm, Dmax/Dmin=1.5, D/φ=9.0 and pitch of 11.7 mm. It has been found out that the belt construction as described above significantly exhibits the characteristics inherent to the helically formed steel filament. That is, the intermediate reinforcing layer 3B functions to reduce the interlayer shearing strain, the intermediate reinforcing layer 1B functions to eliminate the carcass wave and belt wave and the intermediate reinforcing layer 5B functions to prevent separation failure due to cuts subjected to the tread.

As can be seen from the various embodiments described above, the inventors have discovered that the use of the helically formed filament as the intermediate reinforcing layer ensures an unexpected result, as follows.

That is, the intermediate reinforcing layer containing a bundle or bundles of helically formed filaments assembled together without twisting at random with the adjacent filaments curled in different directions is sandwiched between the cord layers and hence the intermediate reinforcing layer functions to exhibit so-called honeycomb effect. As a result, the intermediate reinforcing layer enables the production of tires which are light in weight and have excellent rigidity.

What is claimed is:

1. In a pneumatic radial tire comprising a reinforcing belt layer including helically formed filaments, comprising a carcass including cords arranged in a substantially parallel orientation with the vertical center section through the rotational axis of the tire and a belt interposed between said carcass and a tread and including at least two main layers having cords formed of inextensible material such as a steel cord, said cords being inclined at a mall angle along two directions crossed with respect to the circumferential direction of the tire, the improvement comprising; an intermediate reinforcing layer interposed between said main belt layers and composed of at least one rubberized layer including reinforcing elements spaced apart from each other and embedded therein, said reinforcing element being formed of at least a helically formed filament formed of material having a tensile breaking strength of at least 140 kg/mm², said reinforcing element having an elongation at tensile breaking strength of at least 1.2 times the smallest elongation at tensile breaking strength of the cords of said main belt layers, said intermediate reinforcing layer as a whole being extensible and compressible.

2. The pneumatic radial tire according to claim 1, wherein said helically formed filament of said reinforcing element has a filament diameter φ of 0.1 to 1.0 mm and average diameter D of an outer contour projected on a plane perpendicular to the axial direction of one pitch of said reinforcing filament, that is, (Dmax+Dmin)/2 of 2φ to 20φ.

3. The pneumatic radial tire according to claim 1, wherein said helically formed filament of said reinforcing element is formed of a steel wire.

4. The pneumatic radial tire according to claim 1, wherein said cord of the main belt layer is inclined at an angle of at most 30° with respect to the circumferential direction of the tire and the said reinforcing element of the intermediate reinforcing layer is inclined at an angle of 15° to 75° with respect to the circumferential direction of the tire.

5. The pneumatic radial tire according to claim 1, wherein said rubberized layer including said reinforcing elements embedded therein is formed of rubber having a Shore A hardness of 50° to 85°, 300% modulus of elasticity of 100 to 250 kg/cm² and tensile breaking strength of 150 to 250 kg/cm².

6. The pneumatic radial tire according to claim 1 further comprising, said reinforcing element being formed of a bundle of helically formed filaments.

7. The pneumatic radial tire according to claim 1 wherein said carcass cords are arranged in parallel with the vertical center section through the rotational axis of the tire.

* * * * *